US009811225B2

(12) United States Patent
Yoo et al.

(10) Patent No.: US 9,811,225 B2
(45) Date of Patent: Nov. 7, 2017

(54) TOUCHSCREEN HAVING SHAPED INSULATION PART AND METHOD FOR MANUFACTURING SAME (71) Applicant: LG Chem, Ltd., Seoul (KR)

(72) Inventors: Jaehyun Yoo, Daejeon (KR); Joonhyung Kim, Daejeon (KR); Mikyoung Kim, Daejeon (KR)

(73) Assignee: LG Chem, Ltd. (KR)

( * ) Notice: Subject to any disclaimer, the term of this patent is extended or adjusted under 35 U.S.C. 154(b) by 57 days.

(21) Appl. No.: 14/911,955

(22) PCT Filed: Aug. 28, 2014

(86) PCT No.: PCT/KR2014/008029
§ 371 (c)(1),
(2) Date: Feb. 12, 2016

(87) PCT Pub. No.: WO2015/037844
PCT Pub. Date: Mar. 19, 2015

(65) Prior Publication Data
US 2016/0231839 A1 Aug. 11, 2016

(30) Foreign Application Priority Data

Sep. 10, 2013 (KR) .................. 10-2013-0108405
Aug. 27, 2014 (KR) .................. 10-2014-0112274

(51) Int. Cl.
G06F 3/045 (2006.01)
G06F 3/044 (2006.01)
(52) U.S. Cl.
CPC .... G06F 3/044 (2013.01); *G06F 2203/04103* (2013.01); *G06F 2203/04111* (2013.01)
(58) Field of Classification Search
CPC ..................................................... G06F 3/044
(Continued)

(56) References Cited

U.S. PATENT DOCUMENTS 8,822,865 B2    9/2014  Hwang et al.
2010/0073310 A1* 3/2010 Liang .................. G06F 3/044
                                                                345/173
(Continued)

FOREIGN PATENT DOCUMENTS

JP         3144563 B2     3/2001
JP      2010231287 A     10/2010
(Continued)

OTHER PUBLICATIONS

International Search Report for Application No. PCT/KR2014/008029 dated Dec. 12, 2014.

*Primary Examiner* — Long D Pham
(74) *Attorney, Agent, or Firm* — Lerner, David, Littenberg, Krumholz & Mentlik, LLP (57) ABSTRACT

Disclosed is a single-side single-sheet touchscreen, including a substrate; a first conductive pattern, formed in a transverse direction (x-axis) on a surface of the substrate and including at least two pattern columns, each having two or more conductive pattern regions that are electrically connected to each other; a second conductive pattern, formed on the surface of the substrate on which the first conductive pattern is formed and including two or more conductive pattern regions that are not electrically connected to the first conductive pattern and are not electrically connected to each other; a transparent electrode for electrically connecting the conductive pattern regions of the second conductive pattern in a longitudinal direction (y-axis); and a transparent insulation part, disposed between the transparent electrode and the first conductive pattern to electrically insulate the transparent electrode and the first conductive pattern from each other, wherein the transparent insulation part has a blank space at a portion that comes into contact with the second (Continued)

conductive pattern. A method of manufacturing the same is also provided.

20 Claims, 10 Drawing Sheets

(58) Field of Classification Search
  USPC .......................................................... 345/174
  See application file for complete search history.

(56) References Cited

U.S. PATENT DOCUMENTS

| | | |
|---|---|---|
| 2012/0127387 A1 | 5/2012 | Yamato et al. |
| 2013/0135231 A1 | 5/2013 | Park et al. |
| 2014/0027264 A1* | 1/2014 | Chiu .................... H03K 17/962 |
| | | 200/600 |
| 2014/0118635 A1* | 5/2014 | Yang ..................... G06F 1/1692 |
| | | 349/12 |
| 2014/0320761 A1* | 10/2014 | Misaki ................... G06F 3/044 |
| | | 349/12 |

FOREIGN PATENT DOCUMENTS

| | | |
|---|---|---|
| KR | 20120031896 A | 4/2012 |
| KR | 20120092004 A | 8/2012 |
| KR | 20130033533 A | 4/2013 |
| KR | 20130060450 A | 6/2013 |
| KR | 20130060779 A | 6/2013 |
| KR | 20130074380 A | 7/2013 |

* cited by examiner

P1 : FIRST CONDUCTIVE PATTERN
P2 : SECOND CONDUCTIVE PATTERN

FIG. 7A

P1 : FIRST CONDUCTIVE PATTERN
P2 : SECOND CONDUCTIVE PATTERN

FIG. 7B

TOUCHSCREEN HAVING SHAPED INSULATION PART AND METHOD FOR MANUFACTURING SAME

CROSS-REFERENCE TO RELATED APPLICATION

This application is a national phase entry under 35 U.S.C. §371 of International Application No. PCT/KR2014/008029, filed on Aug. 28, 2014, which claims priority to Korean Patent Application No. 10-2013-0108405, filed on Sept. 10, 2013, and Korean Patent Application No. 10-2014-0112274, filed Aug. 27, 2014, the disclosures of which are incorporated herein by reference.

TECHNICAL FIELD

The present invention relates to a touchscreen using a new type of insulation part and a method of manufacturing the same. More particularly, the present invention relates to a touchscreen and a method of manufacturing the same, in which the insulation part of the touchscreen is provided in the form of an H shape.

BACKGROUND ART

Typically, a single-sided, single-sheet touchscreen is configured such that upper and lower substrates respectively having conductive patterns formed thereon are laminated together, with an insulating layer being interposed therebetween. The manufacture of such a single-sided single-sheet touchscreen includes forming a metal mesh pattern, forming an insulating layer, and forming a bridge electrode. As for a single-sided single-sheet touchscreen, x- and y-axis mesh patterns are formed on the same surface, and the x-axis mesh patterns are interconnected to each other but the y-axis mesh patterns are disconnected. Since the x- and y-axis patterns must be separated from each other, a single-sided single-sheet touchscreen requires an insulating layer for separating the x-axis and y-axis patterns. In order to connect the disconnected y-axis patterns after formation of the insulating layer, an overbridge electrode is formed using a transparent electrode composed of a conductive polymer or a silver (Ag) nanowire.

However, the metal mesh substrate and the insulating layer have different surface energies, and thus when the transparent electrode pattern is formed, the line width and thickness of the transparent electrode are not uniform on the metal mesh substrate and the insulating layer. This is because, due to the difference in surface energy between the metal mesh substrate and the transparent insulating layer, the contact angles defined by ink for the transparent electrode on the above two materials are different. Accordingly, there is a need for an insulating layer for forming a transparent electrode in a uniform pattern while separating the connected metal meshes oriented in a transverse direction (x-axis) from the y-axis metal meshes.

In this regard, Korean Patent Application Publication No. 2012-0031896 discloses the formation of a conductive layer for connecting electrode layers in the formed recess using an inkjet printing process, but is problematic in that the pattern for the insulating layer cannot be formed to a uniform line width and thickness.

DISCLOSURE

Technical Problem

Therefore, the present invention has been made keeping in mind the above problems encountered in the related art, and an object of the present invention is to provide a pattern for an insulating layer, which enables the formation of a transparent electrode in a uniform pattern while separating the connected metal meshes oriented in a transverse direction (x-axis) from the metal meshes oriented in a longitudinal direction (y-axis), so that transmittance and haze, as well as electrical conductivity of the transparent electrode, are maintained constant, and the problem of spreading due to the difference in surface energy between the insulating layer and the metal mesh substrate may be prevented.

Technical Solution

In order to accomplish the above object, the present invention provides a single-sided single-sheet touchscreen, comprising: a substrate; a first conductive pattern, formed in a transverse direction (x-axis) on a surface of the substrate and comprising at least two pattern columns, each including two or more conductive pattern regions that are electrically connected to each other; a second conductive pattern, formed on the surface of the substrate on which the first conductive pattern is formed and comprising two or more conductive pattern regions that are not electrically connected to the first conductive pattern and are not electrically connected to each other; a transparent electrode for electrically connecting the conductive pattern regions of the second conductive pattern in a longitudinal direction (y-axis); and a transparent insulation part disposed between the transparent electrode and the first conductive pattern to electrically insulate the transparent electrode and the first conductive pattern from each other, wherein the transparent insulation part has a blank space at a portion that comes into contact with the second conductive pattern.

In addition, the present invention provides a method of manufacturing a single-sided single-sheet touchscreen, comprising: forming a first conductive pattern in a transverse direction (x-axis) on a surface of a substrate, the first conductive pattern comprising at least two pattern columns, each including two or more conductive pattern regions that are electrically connected to each other; forming a second conductive pattern on the surface of the substrate on which the first conductive pattern is formed, the second conductive pattern comprising two or more conductive pattern regions that are not electrically connected to the first conductive pattern and are not electrically connected to each other; forming a transparent insulation part having a blank space at a portion that is electrically connected to the first conductive pattern and comes into contact with the second conductive pattern to electrically connect the conductive pattern regions of the second conductive pattern in a longitudinal direction (y-axis); and forming a transparent electrode for electrically connecting the conductive pattern regions of the second conductive pattern in a longitudinal direction (y-axis).

Advantageous Effects

According to the present invention, a single-sided single-sheet touchscreen is configured such that the connected metal meshes oriented in a transverse direction (x-axis) are separated from the metal meshes oriented in a longitudinal direction (y-axis) and a transparent electrode is formed in a uniform pattern, whereby transmittance and haze, as well as electrical conductivity of the y-axis electrode, can be maintained constant, and the electrical conductivity of the y-axis electrode can be prevented from decreasing, which can occur due to increased resistance of a specific portion of the transparent electrode that is biased because of the problem of spreading due to the difference in surface energy between the insulating layer and the metal mesh substrate.

BEST MODE

Hereinafter, the present invention is described in detail.

The present inventors have found that, based on the method of forming two or more conductive patterns, which are insulated from each other, on the same surface of a single substrate, a single-sided single-sheet touchscreen may be manufactured using a transparent insulation part having a specific shape, thereby enhancing the performance of a transparent electrode. Therefore, the present invention is intended to provide a single-sided single-sheet touchscreen using a novel type of insulation part and a method of manufacturing the same.

As used herein, the longitudinal direction (y-axis) and the transverse direction (x-axis) indicate the relative directions, and when any one direction is determined, the other direction is determined relative to the above any one direction. This is because the x-axis and y-axis are not absolute when a touchscreen is rotated. For example, the longitudinal direction may represent left and right directions or up and down directions, or to a diagonal direction or any other direction at any specific angle. The longitudinal direction and the transverse direction need not necessarily be orthogonal to each other, and may form any angle that is acceptable in the art. For example, the angle between the longitudinal direction and the transverse direction may range from 80 to 100°.

As used herein, the conductive pattern means that a pattern having conductivity is provided in a specific shape on a predetermined portion of the surface, not on the entire surface. The conductive pattern may include two or more conductive pattern regions, as will be described later, and at least two pattern columns each comprising two or more conductive pattern regions may be provided. In the present invention, a metal pattern may be used as the conductive pattern. The metal pattern is understood to include not only a pattern comprising a metal alone but also a pattern comprising a metal and an additive.

As used herein, the term "conductive pattern region" refers to a predetermined region in which the conductive pattern is formed to have a certain area.

Herein, the conductive pattern region means that the patterns having a predetermined area are arranged in any one direction. The patterns having a predetermined area need not necessarily be arranged in a straight line, and may be arranged in a predetermined direction so that they are directly electrically connected to each other or are electrically connected to each other by means of the transparent electrode.

As used herein, the term "transparent" refers to a light transmittance of 50% or more, preferably 75% or more, and more preferably 85% or more.

According to the present invention, the single-sided single-sheet touchscreen comprises: a substrate; a first conductive pattern, formed in a transverse direction (x-axis) on a surface of the substrate and comprising at least two pattern columns, each including two or more conductive pattern regions that are electrically connected to each other; a second conductive pattern, formed on the surface of the substrate on which the first conductive pattern is formed and comprising two or more conductive pattern regions that are not electrically connected to the first conductive pattern and are not electrically connected to each other; a transparent electrode for electrically connecting the conductive pattern regions of the second conductive pattern in a longitudinal direction (y-axis); and a transparent insulation part, disposed between the transparent electrode and the first conductive pattern to electrically insulate the transparent electrode and the first conductive pattern from each other.

Figure 7A:
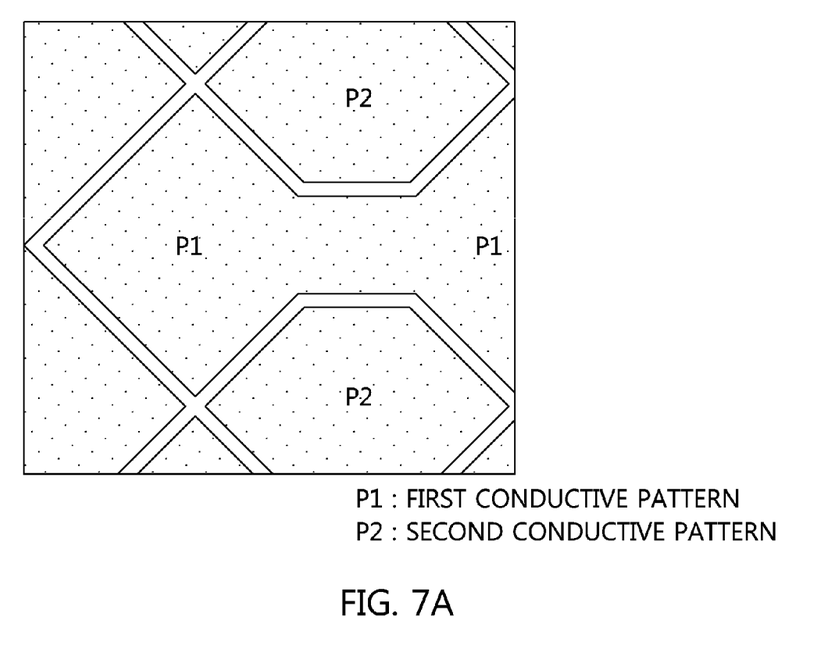
FIG. 7a illustrates the conductive pattern structure of the touchscreen.

The structure of the single-sided single-sheet touchscreen according to the present invention will now be described. FIG. 7(a) illustrates the surface on which the first conductive pattern P1 and the second conductive pattern P2 are formed, wherein the conductive pattern regions P1 of the first conductive pattern are electrically connected to each other. On the other hand, two conductive pattern regions P2, P2' of the second conductive pattern are not electrically connected to each other. This is because they may come into contact with the first conductive pattern when they are electrically connected to each other.

Figure 7B:
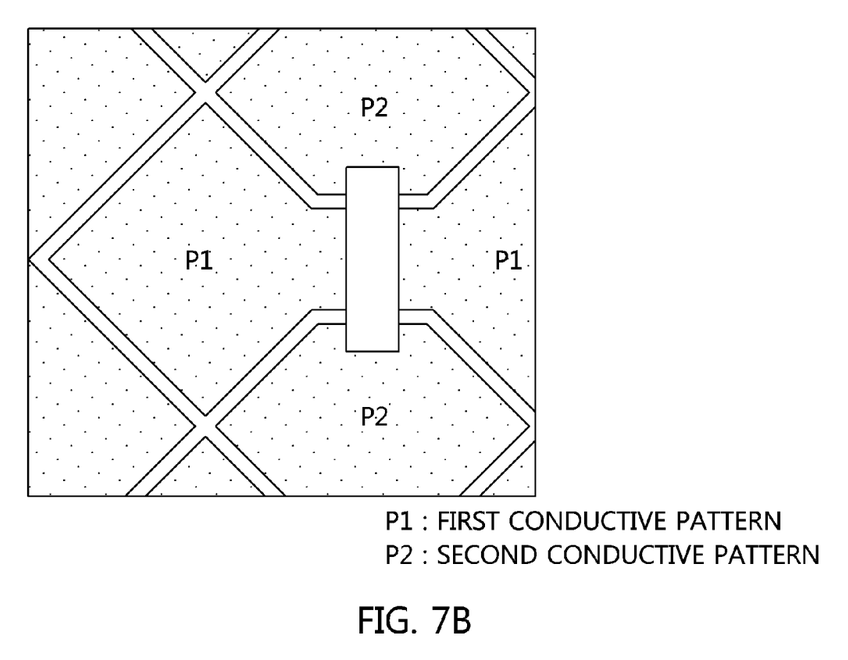
FIG. 7b illustrates another conductive pattern structure of the touchscreen.

In the case where the two conductive pattern regions P2 of the second conductive pattern are electrically connected to each other, the region that is regarded as coming into contact with the first conductive pattern is provided with the transparent insulation part, as shown in FIG. 7(b), and the transparent electrode is formed on the transparent insulation part, whereby the two conductive pattern regions P2 of the second conductive pattern are electrically connected to each other.

In the present invention, the thickness of the transparent insulation part is not particularly limited, and preferably ranges from 400 to 1200 nm. Also, the width of the transparent insulation part is not particularly limited so long as the transparent electrode and the first conductive pattern may be insulated from each other. Also, the material for the transparent insulation part is not particularly limited so long as it has insulating properties and is transparent, and preferably useful is an epoxy insulating ink having superior insulating properties.

Figure 1:
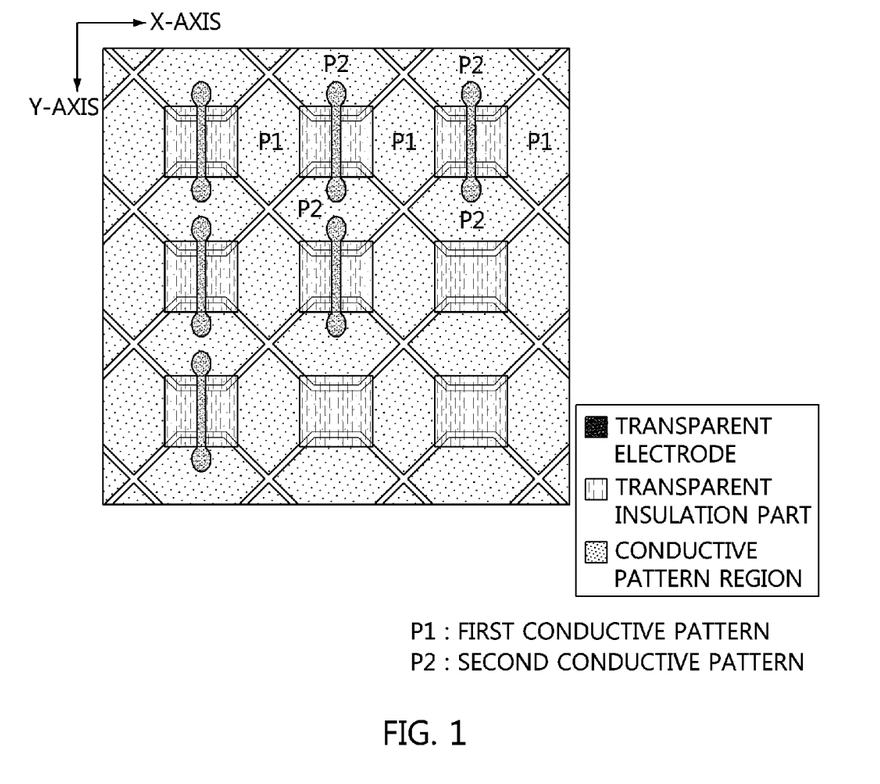
FIG. 1 illustrates a touchscreen using a conventional insulating layer.

In the present invention, the transparent insulation part has a blank space at a portion that comes into contact with the second conductive pattern. The transparent insulation part is disposed between the transparent electrode and the first conductive pattern, whereby the conductive pattern regions of the second conductive pattern may be electrically connected in a longitudinal direction (y-axis) by the transparent electrode. In the case where a conventional insulating layer having a rectangular shape is used, as shown in FIG. 1, the contact angle of ink used for forming the transparent electrode is larger in the transparent insulation part than in the conductive pattern region, thus causing the problem in which the line width of the formed transparent electrode is narrow in the insulating layer but is wide in the conductive pattern region.

However, since the transparent insulation part according to the present invention has a blank space at the portion that comes into contact with the second conductive pattern, the transparent electrode may be formed so as to have a predetermined shape. The transparent insulation part having a blank space, according to the present invention, may be provided in the form of an H shape, or an H shape the top and bottom of which are closed.

Figure 2A:
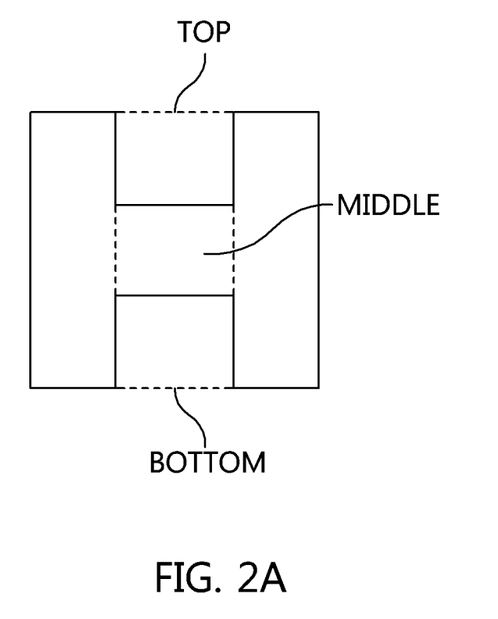
FIG. 2a illustrates the structure of an insulating layer according to an embodiment of the present invention.
Figure 2B:
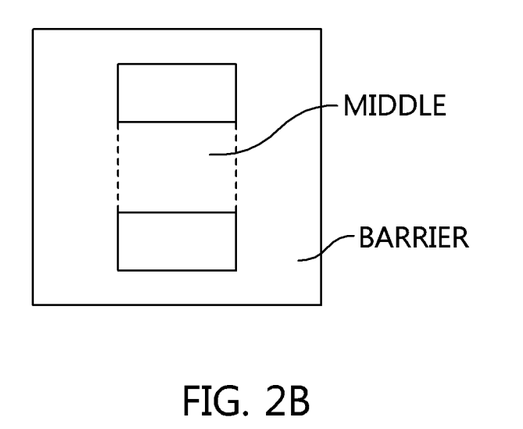
FIG. 2b illustrates the structure of an insulating layer according to another embodiment of the present invention.

In the present invention, the transparent insulation part having blank spaces may be realized as depicted in FIG. 2.

Figure 3A:
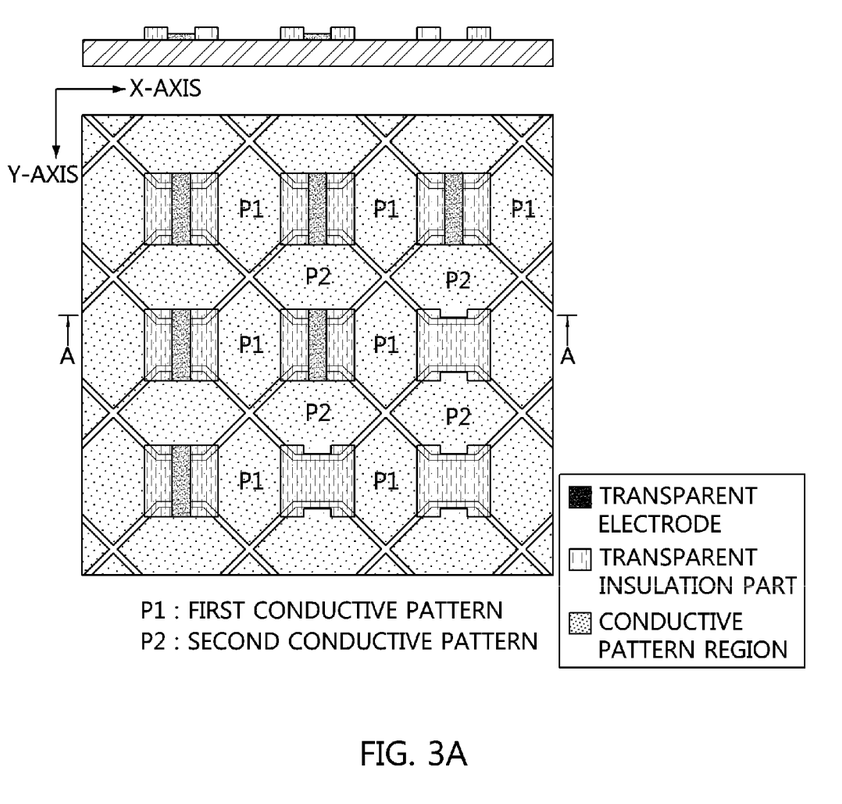
FIG. 3a illustrates a touchscreen using the insulating layer according to an embodiment of the present invention.
Figure 3B:
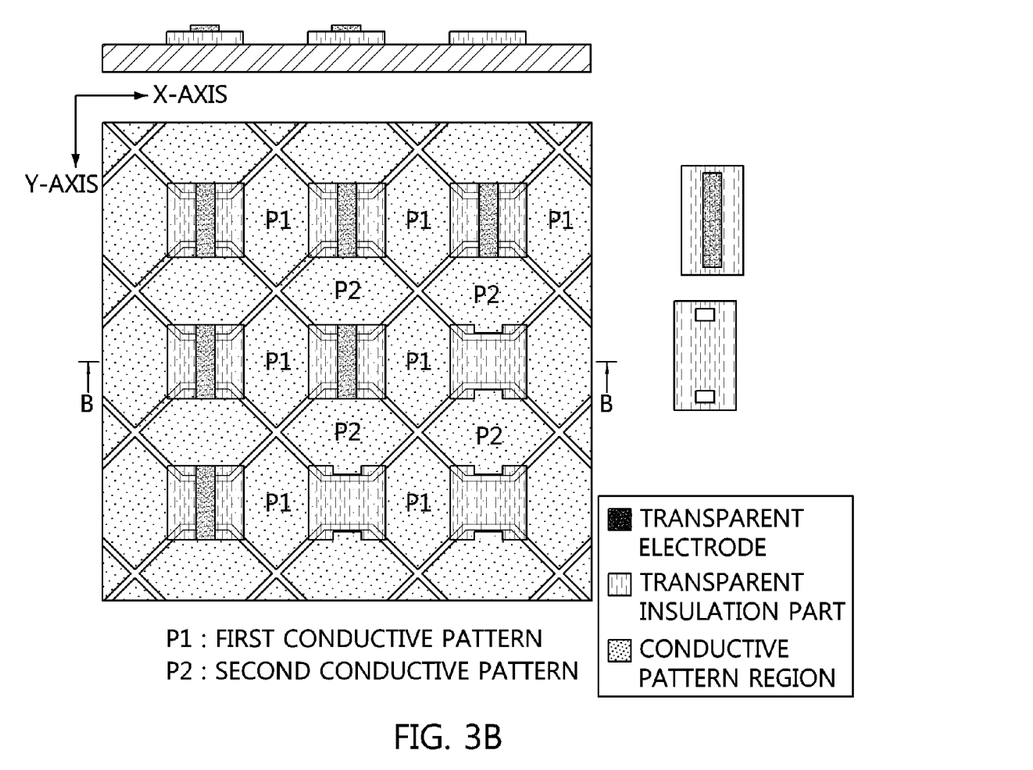
FIG. 3b illustrates a touchscreen using the insulating layer according to another embodiment of the present invention.

According to the present invention, the transparent insulation part is H-shaped as shown in FIG. 2(a), with the blank spaces at the top and bottom thereof. When the pattern for the transparent electrode is formed using the transparent insulation part having such a shape, as shown in FIGS. 3(a) and (b), the contact angle of the conductive ink is smaller in the conductive pattern region than in the insulation part, and thus the conductive ink is more efficiently spread, whereby the transparent electrode is formed only on the conductive pattern region.

Figure 6:
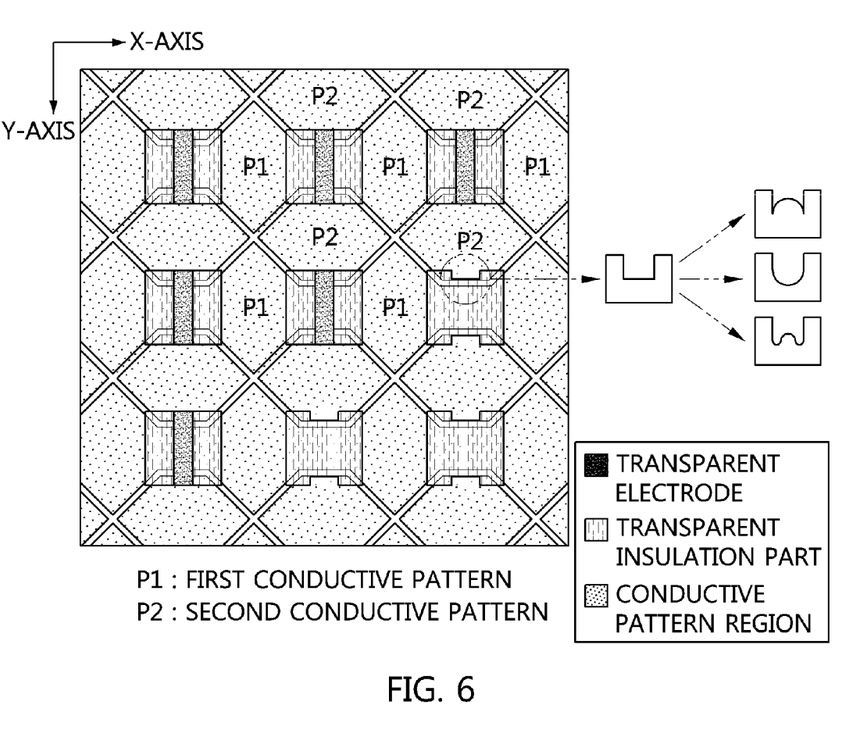
FIG. 6 illustrates a touchscreen using the insulating layer according to still a further embodiment of the present invention.

Also, a textured portion may be formed in the middle of the H-shaped transparent insulation part. As illustrated in FIG. 6, the middle of the H-shape may be imparted with a textured portion. Since the insulation part to which the conductive ink is applied has a thickness different from that of the conductive pattern region, a height difference of about 400 to 1000 μm may occur, and thereby the formed transparent electrode may break or the connection thereof may become weak, undesirably decreasing conductivity. Hence, when a textured portion is formed at the middle of the H shape, the boundary between the insulation part and the conductive pattern region is formed not to be straight but to be variously curved, thus preventing the above problems from occurring.

Figure 4:
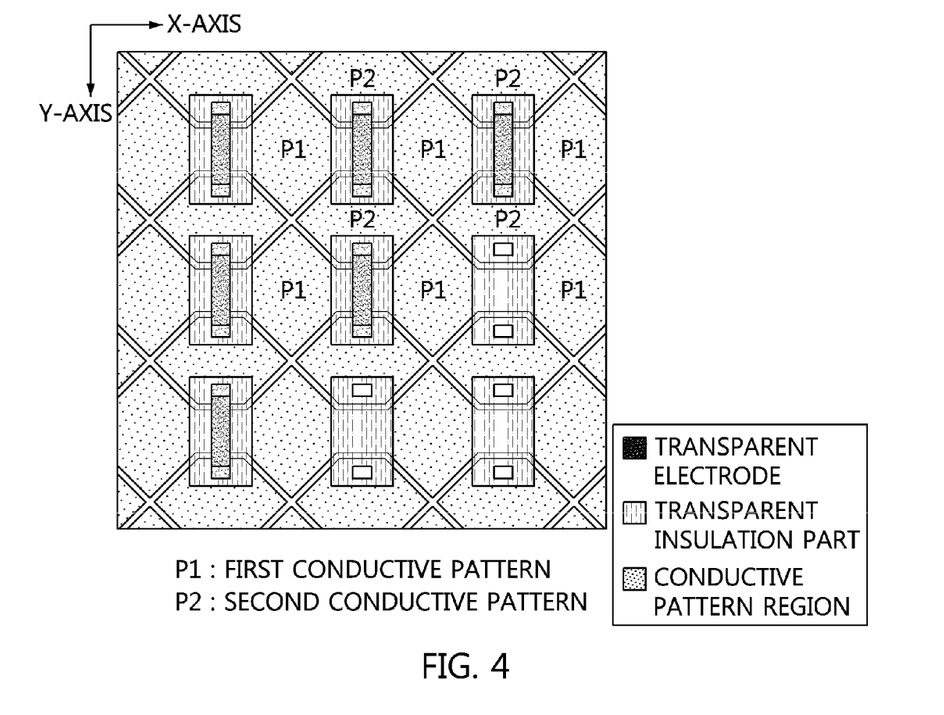
FIG. 4 illustrates a touchscreen using the insulating layer according to a further embodiment of the present invention.

When the blank spaces are not formed at the ends of the top and bottom of the H-shaped part, as shown in FIG. 2(a), an H-shaped part, the top and bottom of which are closed as shown in FIG. 2(b), is obtained. In this case, blank spaces are formed inside the transparent insulation part, and are enclosed by the barrier and the middle. When using the transparent insulation part in which blank spaces are not formed at the top and bottom thereof, the end of the transparent electrode may block the spread of ink toward the conductive pattern region, thus forming a transparent electrode having a uniform size compared to when using the H-shaped transparent insulation part having blank spaces at the top and bottom thereof as shown in FIG. 4.

Figure 5A:
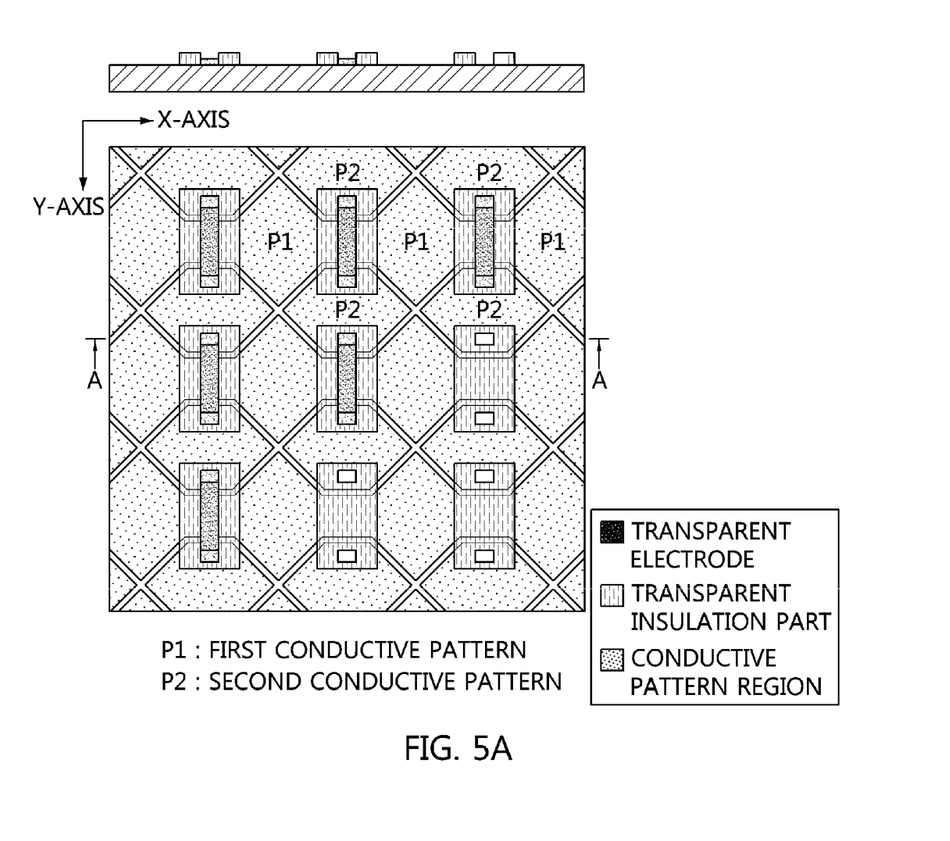
FIG. 5a illustrates a touchscreen using the insulating layer according to still another embodiment of the present invention.
Figure 5B:
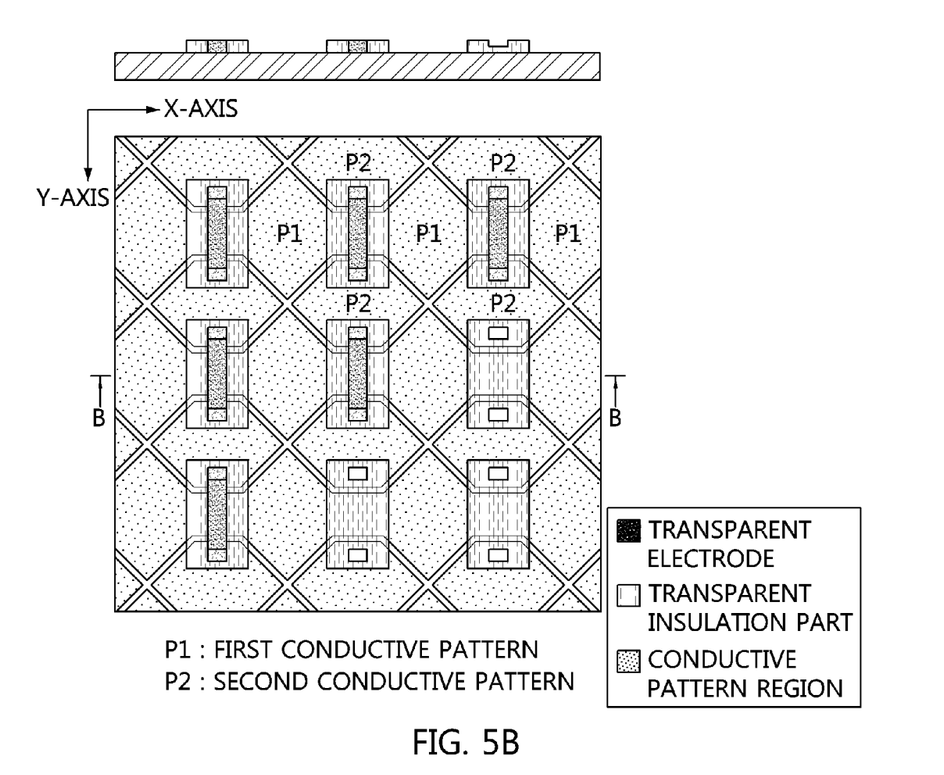
FIG. 5b illustrates a touchscreen using the insulating layer according to yet another embodiment of the present invention.

Also, the transparent insulation part having no blank space at the top and bottom thereof may be configured such that the barrier thereof is thicker than the middle thereof. As shown in FIGS. 5(a) and (b), since the transparent electrode formed by the insulating layer is adjusted by the width of the thin insulating layer, the line width of the transparent electrode may be uniformly controlled. In order to uniformly adjust the line width of the transparent electrode as mentioned above, the barrier is preferably formed to be at least 200 nm thicker than the middle of the insulation part. If the barrier is less than 200 nm thicker than the middle of the insulation part, the resulting transparent electrode may overflow. The thickness of the middle of the insulation part is preferably set within the range from 400 to 1000 nm. If the thickness of the middle of the insulation part is less than 400 nm, it may come into contact with the conductive pattern to thus realize electrical conduction. On the other hand, if the thickness thereof is greater than 1000 nm, conductivity may decrease due to the thickness difference. Also, the thickness of the barrier is preferably set to 600 to 1200 nm.

In order to make the transparent insulation part in which the barrier is thicker than the middle, some pixels are removed upon inkjet printing, thereby decreasing the thickness of the middle of the insulation part.

The transparent electrode according to the present invention is formed on the transparent insulation part, and the material therefor may be used without limitation, so long as it has high light transmittance, for example, 75% or more, 80% or more, or 85% or more. Specifically, the transparent electrode may be formed of a conductive polymer such as PEDOT:PSS or an Ag nanowire.

Also, at least one of the transparent insulation part and the transparent electrode is preferably formed using an inkjet printing process or a dispensing process.

Also, the transparent electrode according to the present invention is formed on the transparent insulation part and is thus thin, for example, preferably has a thickness of 50 to 100 nm. Since the transparent electrode according to the present invention is thin, it has a light transmittance of 85% or more, and preferably 85 to 95%, thus exhibiting transparency. Hence, the transparent electrode according to the present invention may be visually concealed, with improved visibility.

In the present invention, any material may be used for the conductive pattern without limitation, so long as it has conductivity of a predetermined level or more. The material for the conductive pattern is not limited so long as the material itself has no transmittance but enables the transmission of light depending on the line width and light transmittance. For example, the conductive pattern may be provided in the form of a single layer or multiple layers including silver, copper, aluminum, neodymium, molybdenum, nickel or alloys thereof. Furthermore, the material for the conductive pattern may include silver-coated copper particles.

In the present invention, the light transmittance of the total pattern including the first conductive pattern and the second conductive pattern may range from 85% to 99%.

In the present invention, uniform light transmittance may be obtained over the entire region including the first conductive pattern, the second conductive pattern, the transparent insulation part and the transparent electrode. Thereby, the conductive pattern, the transparent insulation part and the transparent electrode may be visually concealed. For this, in the entire region including the first conductive pattern, the second conductive pattern, the transparent insulation part and the transparent electrode, individual components may be disposed so that the light transmittance deviation relative to the average light transmittance of any circle having a diameter of 1 inch is 7% or less, or even 5% or less.

To attain uniform light transmittance, the light transmittance of portions of the first conductive pattern and the second conductive pattern may be controlled to be different from that of the remaining portions. For example, the light transmittance of the conductive pattern in the region corresponding to the transparent electrode is controlled to be greater than that of remaining regions, thereby compensating for the visibility depending on the position of the transparent electrode. The light transmittance may be controlled by adjusting the pitch of the conductive pattern or omitting the pattern.

The present invention addresses a method of manufacturing a single-sided single-sheet touchscreen.

Specifically, the manufacturing method comprises: forming a first conductive pattern in a transverse direction (x-axis) on a surface of a substrate, the first conductive pattern comprising at least two pattern columns, each including two or more conductive pattern regions that are electrically connected to each other; forming a second conductive pattern on the surface of the substrate on which the first conductive pattern is formed, the second conductive pattern comprising two or more conductive pattern regions that are not electrically connected to the first conductive pattern and are not electrically connected to each other; forming a transparent insulation part having a blank space at a portion that is electrically connected to the first conductive pattern and comes into contact with the second conductive pattern so as to electrically connect the conductive pattern regions of the second conductive pattern in a longitudinal direction (y-axis); and forming a transparent electrode for electrically connecting the conductive pattern regions of the second conductive pattern in a longitudinal direction (y-axis).

In the present invention, thermally curing the transparent insulation part in an oven at 120 to 150° C. for 10 to 30 min may be further performed after the transparent insulation part is formed.

In the manufacturing method, the features of the transparent insulation part and the transparent electrode are the same as those of the transparent insulation part of the single-sided single-sheet touchscreen as described above.

Also, the first conductive pattern and the second conductive pattern may be formed by a) forming a conductive layer on the substrate; b) forming an etching resist pattern on the conductive layer; and c) etching the conductive layer using the etching resist pattern, thus forming the conductive pattern.

When the conductive layer is over-etched in c), a conductive pattern having a line width smaller than the width of the etching resist pattern may be formed.

Additionally, d) removing the etching resist pattern or e) reforming the etching resist pattern to cover the conductive pattern may be further performed, after c).

The method of forming the first conductive pattern and the second conductive pattern may be appropriately determined depending on the field of application of the method of manufacturing the conductive pattern.

A better understanding of the present invention may be obtained via the following examples, which are set forth to illustrate, but are not to be construed as limiting the scope of the present invention. The scope of the present invention is described in the claims, and includes meanings equivalent to the claims and all modifications therein.

MODE FOR INVENTION

EXAMPLE 1

On a substrate having a first conductive pattern and a second conductive pattern as shown in FIG. 7, a pattern for an insulation part was formed in an H shape as shown in FIG. 2(a) using a phenol novolac epoxy resin by use of an inkjet printer. The pattern for the insulation part had a thickness of 600 nm, and was thermally cured in an oven at 120° C. for 20 min. Thereafter, a transparent electrode for connecting the second conductive pattern using an Ag nanowire was formed to a thickness of 100 nm, thereby manufacturing a touchscreen.

EXAMPLE 2

A touchscreen was manufactured in the same manner as in Example 1, with the exception that the pattern for the insulation part was formed in an H shape, the top and bottom of which were closed, as shown in FIG. 2(b).

EXAMPLE 3

A touchscreen was manufactured in the same manner as in Example 2, with the exception that the pattern for the insulation part was formed in an H shape, the top and bottom of which were closed as shown in FIG. 2(b), the barrier was formed to a thickness of 1000 nm, and 25% of the pixels were removed from the middle of the insulation part in an inkjet printing process, whereby the middle of the insulation part was formed to a thickness of 500 nm.

EXAMPLE 4

A touchscreen was manufactured in the same manner as in Example 1, with the exception that the pattern for the insulation part was formed in an H shape, the middle of which was formed to be convex, as shown in FIG. 6(a).

COMPARATIVE EXAMPLE 1

A touchscreen was manufactured in the same manner as in Example 1, with the exception that an insulation part having a rectangular shape was formed to a thickness of 600 nm using a conventional process for forming an insulation part.

TEST EXAMPLE

The touchscreens of Examples 1 to 4 and Comparative Example 1 were evaluated to determine the pattern line width, pattern uniformity, electrical conductivity, and visibility of the transparent electrode.

In the touchscreen of Comparative Example 1, the line widths of the transparent electrode on the insulation part and the conductive pattern were different, the pattern was not uniform, and the electrical conductivity of the transparent electrode was not constant. Also, the transparent electrode in the touchscreen was easily observed, and thus visibility was not improved.

However, in the touchscreens of Examples 1 to 4, the transparent electrode had more uniform line width and thickness than that of Comparative Example 1, and the uniformly formed transparent electrode was visually concealed in the touchscreen, and thus visibility was improved.

In the touchscreens of Examples 2 and 3, the ink for the transparent electrode was not spread on the conductive pattern due to the H-shaped insulation part having a closed top and bottom, whereby the pattern of the transparent electrode was quite uniformly formed, compared to Example 1. Particularly in Example 3, the height of the middle of the insulation part was less than the height of the barrier, and thus, the thickness of the transparent electrode was made more constant.

In the touchscreen of Example 4, disconnection of the transparent electrode was significantly reduced, compared to Example 1.

The invention claimed is:

1. A single-sided single-sheet touchscreen, comprising:
a substrate;
a first conductive pattern, formed in a transverse direction (x-axis) on a surface of the substrate and comprising at least two pattern columns, each including two or more conductive pattern regions that are electrically connected to each other;
a second conductive pattern, formed on the surface of the substrate on which the first conductive pattern is formed and comprising two or more conductive pattern regions that are not electrically connected to the first conductive pattern and are not electrically connected to each other;
a transparent electrode for electrically connecting the conductive pattern regions of the second conductive pattern in a longitudinal direction (y-axis); and
a transparent insulation part disposed between the transparent electrode and the first conductive pattern to electrically insulate the transparent electrode and the first conductive pattern from each other,
wherein the transparent insulation part is H-shaped and has a blank space at a portion that comes into contact with the second conductive pattern.

2. The single-sided single-sheet touchscreen of claim 1, wherein the transparent insulation part is configured such that a textured portion is formed at a middle of an H-shaped insulation part.

3. The single-sided single-sheet touchscreen of claim 1, wherein the transparent insulation part is configured such that a top and bottom of an H-shaped insulation part are closed.
wherein the transparent insulation part is configured such that a thickness of a barrier of the H-shaped insulation part is greater than a thickness of a middle thereof.

4. The single-sided single-sheet touchscreen of claim 3, wherein the thickness of the barrier is at least 200 nm greater than the thickness of the middle.

5. The single-sided single-sheet touchscreen of claim 4, wherein the middle has a thickness of 400 to 1000 nm, and the barrier has a thickness of 600 to 1200 nm.

6. The single-sided single-sheet touchscreen of claim 4, wherein at least one of the transparent insulation part and the transparent electrode is formed using an inkjet printing process or a dispensing process.

7. The single-sided single-sheet touchscreen of claim 1, wherein the transparent insulation part has a thickness of 400 to 1200 nm.

8. The single-sided single-sheet touchscreen of claim 1, wherein the transparent electrode comprises a conductive polymer or a silver (Ag) nanowire.

9. The single-sided single-sheet touchscreen of claim 1, wherein the transparent insulation part is formed of an epoxy ink.

10. The single-sided single-sheet touchscreen of claim 1, wherein the transparent electrode has a thickness of 50 to 100 nm.

11. The single-sided single-sheet touchscreen of claim 1, wherein the transparent electrode has a light transmittance of 85 to 95%.

12. A method of manufacturing a single-sided single-sheet touchscreen, comprising:
forming a first conductive pattern in a transverse direction (x-axis) on a surface of a substrate, the first conductive pattern comprising at least two pattern columns, each including two or more conductive pattern regions that are electrically connected to each other;
forming a second conductive pattern on the surface of the substrate on which the first conductive pattern is formed, the second conductive pattern comprising two or more conductive pattern regions that are not electrically connected to the first conductive pattern and are not electrically connected to each other;
forming a H-shaped transparent insulation part having a blank space at a portion that is electrically connected to the first conductive pattern and comes into contact with the second conductive pattern to electrically connect the conductive pattern regions of the second conductive pattern in a longitudinal direction (y-axis); and
forming a transparent electrode for electrically connecting the conductive pattern regions of the second conductive pattern in a longitudinal direction (y-axis).

13. The method of claim 12, wherein the transparent insulation part is configured such that a textured portion is formed at a middle of an H-shaped insulation part.

14. The method of claim 13, wherein the transparent insulation part has a thickness of 400 to 1200 nm.

15. The method of claim 12, wherein the transparent insulation part is configured such that a top and bottom of an H-shaped insulation part are closed,
wherein the transparent insulation part is configured such that a thickness of a barrier of the H-shaped insulation part is greater than a thickness of a middle thereof.

16. The method of claim 15, wherein the thickness of the barrier is at least 200 nm greater than the thickness of the middle.

17. The method of claim 16, wherein the middle has a thickness of 400 to 1000 nm, and the barrier has a thickness of 600 to 1200 nm.

18. The method of claim 12, wherein the transparent electrode has a thickness of 50 to 100 nm.

19. The method of claim 12, wherein the first conductive pattern and the second conductive pattern are formed by:
a) forming a conductive layer on the substrate;
b) forming an etching resist pattern on the conductive layer; and
c) etching the conductive layer using the etching resist pattern, thus forming the conductive pattern.

20. The method of claim 12, further comprising thermally curing the transparent insulation part in an oven at 120 to 150° C. for 10 to 30 min, after the forming the transparent insulation part.

* * * * *